United States Patent [19]

Audibert et al.

[11] Patent Number: 5,507,203
[45] Date of Patent: Apr. 16, 1996

[54] VARIABLE LENGTH SHAFT ASSEMBLY

[75] Inventors: Kevin J. Audibert, Wolcott; Frederick W. Mitchell, III, Terryville; William E. Korzan; John T. Lawson, both of Bethlehem, all of Conn.

[73] Assignee: The Torrington Company, Torrington, Conn.

[21] Appl. No.: 428,509

[22] Filed: Apr. 25, 1995

Related U.S. Application Data

[63] Continuation of Ser. No. 55,337, May 3, 1993, abandoned.

[51] Int. Cl.⁶ .............................. B62D 1/16; F16C 3/03; F16D 3/06
[52] U.S. Cl. .............................. 74/492; 464/84; 464/162
[58] Field of Search ................ 74/492, 493; 464/77, 464/82, 84, 100, 101, 162; 280/775, 777; 403/57, 204, 365, 366

[56] References Cited

U.S. PATENT DOCUMENTS

| | | | |
|---|---|---|---|
| 3,665,777 | 5/1972 | Jensen | 74/492 |
| 3,808,838 | 5/1974 | Bowen et al. | 74/492 |
| 4,014,219 | 3/1977 | Feustel et al. | 74/492 |
| 4,258,960 | 3/1981 | Harris | 308/238 |
| 4,269,043 | 5/1981 | Kizu et al. | 74/492 |
| 4,667,530 | 5/1987 | Mettler et al. | 74/493 |
| 4,962,944 | 10/1990 | Reiche et al. | 280/775 |
| 5,243,874 | 9/1993 | Wolfe et al. | 74/493 |

FOREIGN PATENT DOCUMENTS

| | | | |
|---|---|---|---|
| 1199734 | 6/1959 | France. | |
| 1239096 | 7/1960 | France. | |
| 3513340 | 10/1986 | Germany | 74/493 |
| 3813422 | 11/1989 | Germany | 74/493 |
| 60-42155 | 3/1985 | Japan | 74/492 |
| 1351780 | 5/1974 | United Kingdom | 74/492 |
| 2051998A | 1/1981 | United Kingdom. | |

*Primary Examiner*—John J. Vrablik
*Attorney, Agent, or Firm*—Michael H. Minns

[57] ABSTRACT

A steering shaft coupling comprising: an outer tubular shaft member, a coaxial inner shaft member slidably inserted within the outer tubular shaft member, the outer tubular shaft member having an inner peripheral wall and the inner shaft member having an outer peripheral wall, the inner peripheral wall and the outer peripheral wall having complementary shapes, the complementary shapes transmitting torque between the shaft members, and a biasing member between the inner shaft member and the outer tubular shaft member, the biasing member causing a force opposing the transmitted torque.

5 Claims, 3 Drawing Sheets

5,507,203

VARIABLE LENGTH SHAFT ASSEMBLY

This application is a continuation of application Ser. No. 08/055,337, filed May 3, 1993, abandoned.

BACKGROUND OF THE INVENTION

This invention relates generally to shaft assemblies which are variable in length and more particularly to a shaft assembly which is adaptable for use as the steering shaft in steering devices of motor vehicles.

In certain applications, during the assembly of a vehicle, the shaft assembly, which is attached to the steering column at one end and the steering gear at the other end, must be extended axially in order to be installed to its nominal working position. Therefore, a low force to slide is essential for ease of installation. An additional requirement for the shaft assembly is the ability to accommodate any body/chassis flex due to road conditions.

Generally, in order to decrease the force to slide the shaft assembly axially, the clearance between the male and female members must increase. Consequently, the rotational lash or play of the shaft assembly will increase. Attempts to make steering as responsive as possible have forced the rotational lash requirements to be reduced.

The foregoing illustrates limitations known to exist in present variable length shaft assemblies. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a steering shaft coupling comprising: an outer tubular shaft member, a coaxial inner shaft member slidably inserted within the outer tubular shaft member, the outer tubular shaft member having an inner peripheral wall and the inner shaft member having an outer peripheral wall, the inner peripheral wall and the outer peripheral wall having complementary shapes, the complementary shapes transmitting torque between the shaft members, and a biasing member between the inner shaft member and the outer tubular shaft member, the biasing member causing a force opposing the transmitted torque.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
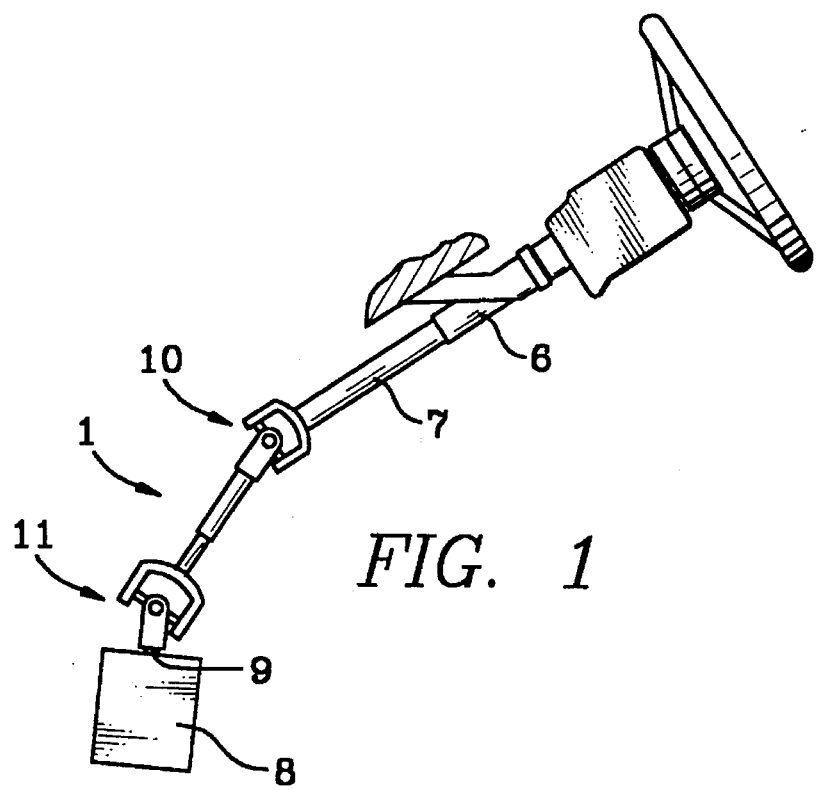
FIG. 1 is a diagrammatical illustration of the steering system of an automobile in which a coupling of the present invention is applied.

FIG. 1 shows an steering shaft coupling 1 of the present invention applied to the steering system of an automobile. The steering shaft coupling 1 is interposed between a steering main shaft 7 extending from a steering column 6 and a steering gear shaft 9 attached to a steering gear case 8. Typically, the steering shaft coupling 1 is connected to the steering main shaft 7 and the steering gear shaft 9 by a pair of universal joints 10, 11.

Figure 2:
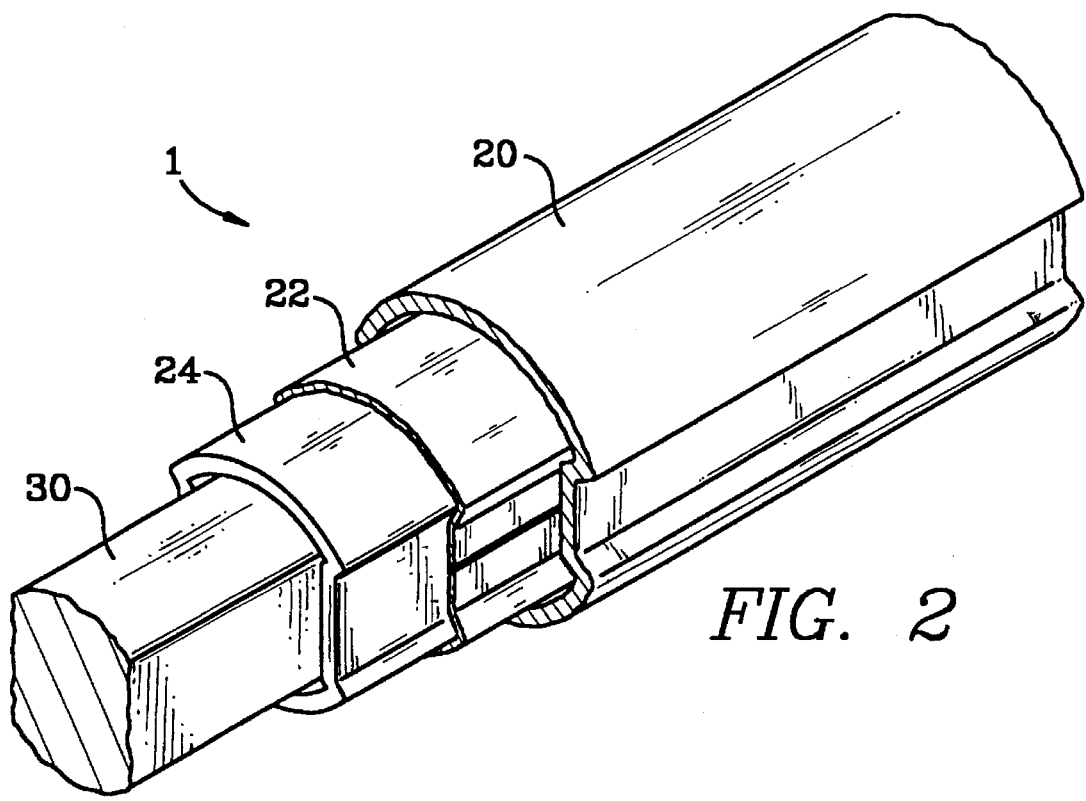
FIG. 2 is a perspective view of a coupling embodying the present invention.

FIG. 2 shows a perspective view of the coupling 1 of the present invention. Portions of the coupling 1 have been removed to show the details of the coupling 1. The coupling 1 is comprised of three main components, an outer tubular shaft member 20, an inner shaft member 24 and a spring member 22 located between the outer shaft member 20 and the inner shaft member 24. The inner shaft member 24 and the outer shaft member 20 are slidable relative to one another. Preferably, the spring member 22 is fixed relative to one of the two shaft members. A lower shaft 30 is connected to the inner shaft member 24. The outer shaft member 20 may be axially extended such that universal joint 10 is attached directly to the outer shaft member 20. An upper shaft member (not shown) may be used to connect the outer shaft member 20 to the universal joint 10.

In the preferred embodiment, the lower shaft 30 is slidable within the inner shaft member 24. This permits the lower and upper portions of the shaft assembly to collapse, either for ease of assembly or during a collision of the automobile. The lower shaft 30 has a double - D shape which permits transmission of torque between the inner shaft member 24 and the lower shaft 30.

The outer shaft member 20, the inner shaft member 24 and the spring member 22 each have shape similar to a double - B. The inner peripheral wall of the outer shaft member 20 and the outer peripheral wall of the inner shaft member 24 have complementary shapes thereby permitting the transmission of rotational torque between the outer shaft member 20 and the inner shaft member 24. In the preferred embodiment, the spring member 22 will also have a shape similar to the shapes of the outer shaft member 20 and the inner shaft member 24. The shape of the members shown in FIGS. 2 and 3 can be described as a two toothed spline.

Figure 3:
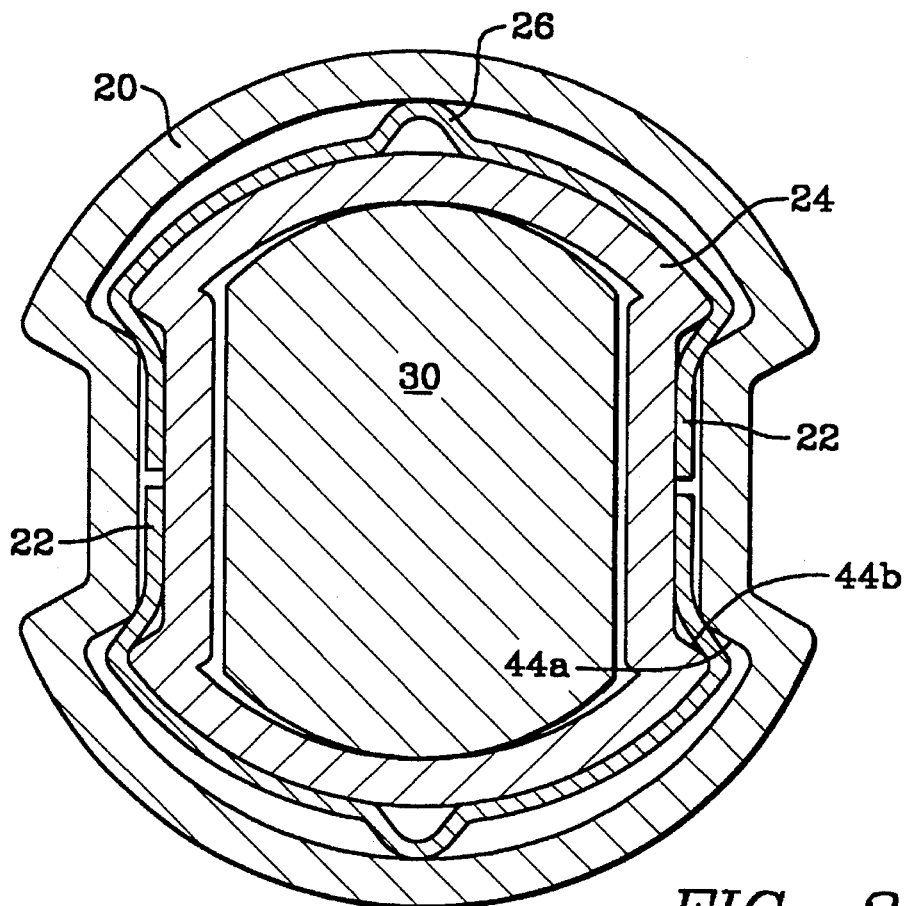
FIG. 3 is a cross-sectional view of the coupling of FIG. 2.

In the preferred embodiment, the spring member 22 is formed of two sections as shown in FIG. 3. Also shown only in FIG. 3 is an anti-rattle bump 26 on opposite sides of the spring member 22. The anti-rattle bump 26 may be needed in some applications remove any looseness between the spring member 22 and the outer shaft member 20 along the curved portions of the outer shaft member 20.

Figure 5:
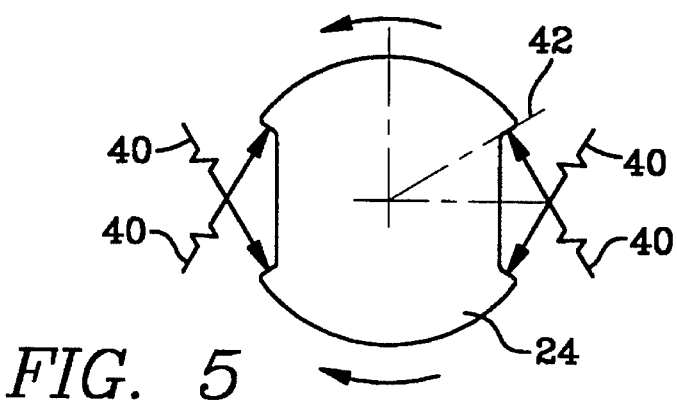
FIG. 5 is a schematic diagram showing the action of the spring forces.

The purpose of the spring member 22 is to take up the rotational clearance between the outer shaft member 20 and the inner shaft member 24. As one shaft member rotates relative to the other shaft member, the spring member exerts a force 40, illustrated in FIG. 5, opposing the transmitted torque. Depending upon the shapes of the shaft members 20, 24 and the spring member 22, any number of spring forces 40 may be generated. For the embodiment shown in FIGS. 2 and 3, two spring forces are generated for clockwise rotation and two spring forces are generated for counter-clockwise rotation as shown in FIG. 5. In the preferred embodiment, a line 42 normal to the spring force 40 intersects the axis of the inner shaft member.

Figure 4:
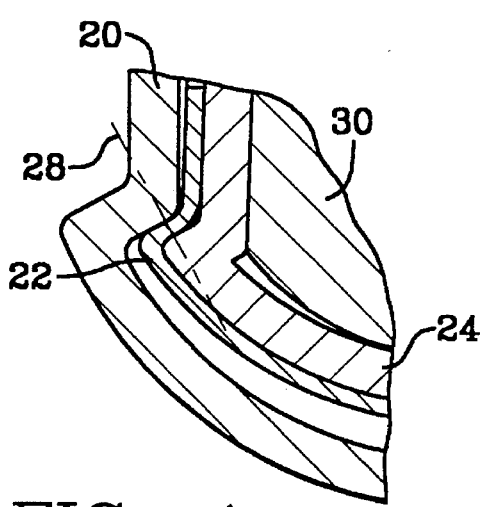
FIG. 4 is a cross-sectional view similar to FIG. 3 showing the coupling with maximum relative rotation between the upper and lower portions of the steering shaft.

An object of this invention is to limit the stress in the spring member 22 as one shaft member rotates relative to the other shaft member. The torque transmitting shapes of the outer shaft member 20, the spring member 22 and the inner shaft member 24 are designed such that as rotational torque begins to be transmitted from one shaft member to the other shaft member through the spring member 22, stress in the spring increases and a spring force opposing the transmitted torque is generated. As the transmitted torque continues to increase, the spring member 22 becomes "sandwiched" between the outer shaft member 20 and the inner shaft member 24, as shown in FIG. 4. Once this occurs, torque is then transmitted directly from one shaft member to the other. The tensile stress in the spring member 22 no longer increases with increasing torque once this point has been reached. Generally, the "sandwiching" of the spring member 22 occurs along a line 28, rather than over broad areas of the spring member 22. Although FIG. 4 shows the "sandwiching" occurring in the region of spring member 22 which generates the spring force, the "sandwiching" can occur in other regions of the spring member 22 depending upon the geometric shapes of the shaft members 20, 24 and the spring member 22. With this design, the spring member 22 usually carries some torque and carries the normal driving loads of the steering column. However, in higher torque and stress conditions, the "sandwiching" effect limits or caps the maximum stress in the spring member 22.

One geometric configuration which will achieve this "sandwiching" effect is to have flat portions 44a, 44b on the outer shaft member 20 and the inner shaft member 24, the flat portions being at an angle to a line passing through the axis of the shafts such that the spring member 22 will be "sandwiched" between the flat portions 44a and 44b.

Another object of the spring member 22 is to minimize the axial sliding load variations between the two shafts. A further object of the spring member 22 is to maintain a predefined relationship between the torsional rate and the axial sliding load.

Figure 6:
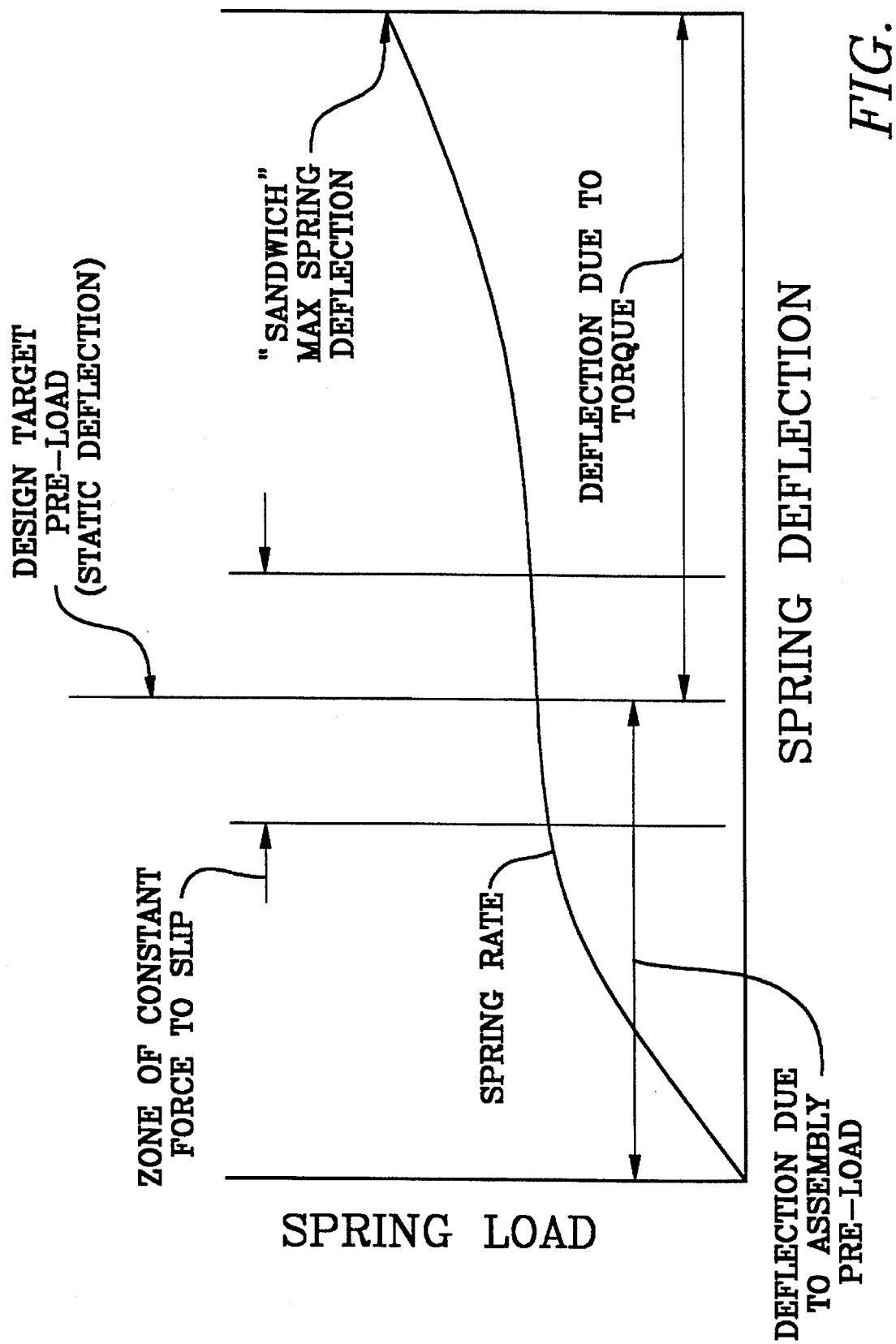
FIG. 6 is a graph showing the spring load versus spring deflection of the coupling shown in FIG. 2.

FIG. 6 which shows the relationship between spring load and spring deflection in a coupling 1 of the present invention illustrates how these objectives are achieved. The graph in FIG. 6 shows three different regions of spring operation. In the first region, as the spring is initially loaded, the spring load increases as spring deflection increases. In the second region, the spring load remains essentially constant as spring deflection increases. Then the coupling 1 enters the third region where the spring load again increases with increasing spring deflection or coupling loading. The spring load increases until the spring member 22 is "sandwiched" between the inner shaft member 24 and the outer shaft member 20, as shown in FIG. 4.

For ease of assembly, a low force to slip between the outer shaft member 20 and the inner shaft member 24 is desired. The force to slip (FTS) or axial sliding load is determined by the following equation:

$$\text{FORCE TO SLIP} = \left( \begin{array}{c} \text{ASSEMBLY} \\ \text{PRE-LOAD} \end{array} + \begin{array}{c} \text{PART MANUFACTURING} \\ \text{VARIATION} \end{array} \right) \times \left( \begin{array}{c} \text{SPRING} \\ \text{RATE} \end{array} \right) \times \begin{array}{c} \text{COEFFICIENT} \\ \text{OF FRICTION} \end{array}$$

The spring rate of a spring is defined as the change in the spring load for a given change in the spring deflection. The second region on the graph shown in FIG. 6 illustrates a low spring rate. The initial loading (pre-load) of the spring members 22 in coupling 1 is chosen such that the pre-load falls in this second region of low spring rate. As shown in the equation above, variations in the force to slip as a result of part manufacturing tolerances or variations will be limited because of the small or zero spring rate. The spring rate curve of coupling 1 is designed to provide a given rate to slip by providing a pre-determined assembled spring preload.

Having described the invention, what is claimed is:

1. A steering shaft coupling comprising:

an outer tubular shaft member;

a coaxial inner shaft member slidably inserted within the outer tubular shaft member;

the outer tubular shaft member having an inner peripheral wall and the inner shaft member having an outer peripheral wall, the inner peripheral wall and the outer peripheral wall having complementary shapes, the complementary shapes transmitting torque between the shaft members;

an axially extending spring between the inner shaft member and the outer tubular shaft member, the axially extending spring causing a force opposing the transmitted torque, the axially extending spring having three different regions of spring operation, a first region exhibiting an increasing spring load with an increasing spring deflection, a second region following the first region in which the spring load remains essentially constant with increasing spring deflection, and a third region following the second region where the spring load again increases with increasing spring deflection, the spring having a pre-load applied thereto go as to pre-load the spring into the second region of spring operation, the axially extending spring being in sliding contact with the inner shaft member and the outer shaft member; and a means for preventing stress within the axially extending spring from exceeding a predetermined maximum as the torque between the shaft members increases, said means including complementary flat members on the shaft members which sandwich the spring.

2. The steering shaft coupling according to claim 1 wherein the spring has a shape complementary to the inner peripheral wall and the outer peripheral wall.

3. The steering shaft coupling according to claim 1 wherein a line normal to the force opposing the transmitted torque intersects the axis of the inner shaft member.

4. The steering shaft coupling according to claim 1 wherein the spring causes a plurality of forces opposing the transmitted torque.

5. The steering shaft coupling according to claim 1 wherein the axially extending spring is formed of two parts.

* * * * *